Figure 1:
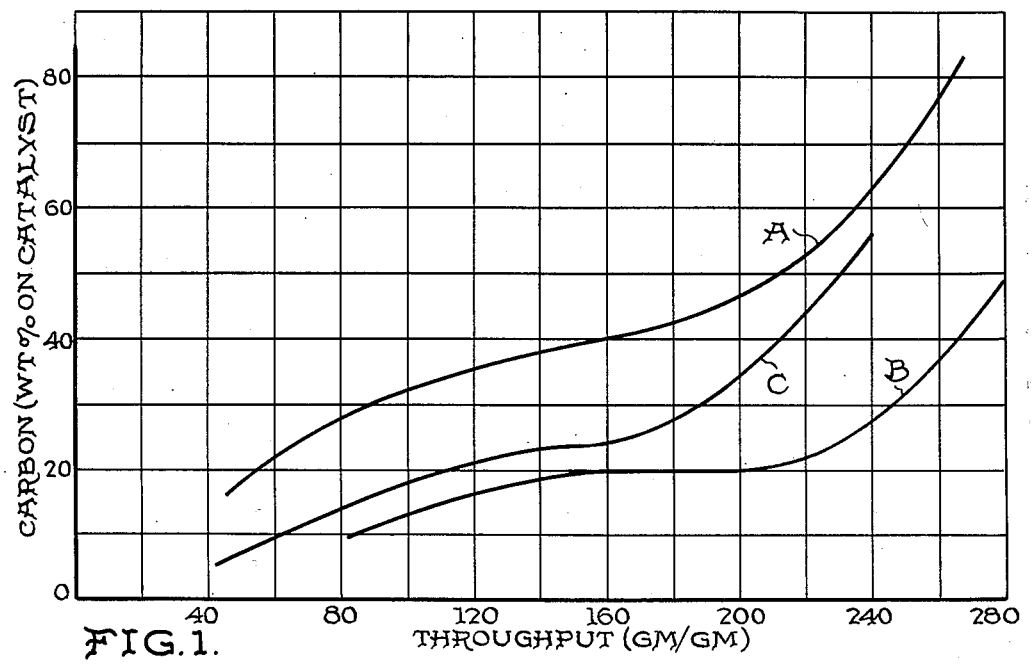

INVENTOR.
VICTOR J. ANHORN
BY
HIS ATTORNEY

United States Patent Office 2,791,546
Patented May 7, 1957

2,791,546

FLUIDIZED CATALYTIC HYDRODESULFURIZATION AND HYDROCRACKING

Victor J. Anhorn, Oakmont, Pa., assignor to Gulf Research & Development Company, Pittsburgh, Pa., a corporation of Delaware Application October 22, 1951, Serial No. 252,483

4 Claims. (Cl. 196—53)

This invention relates to an improved method for catalytically hydrodesulfurizing hydrocarbon mixtures which contain residual components. More particularly, the invention relates to a method of operating a fluidized fixed bed catalytic hydrodesulfurization process in connection with a feed comprising a hydrocarbon mixture of the type described, whereby the on-stream or processing period may be greatly increased without unduly increasing the time required for regeneration of the catalyst, without conversion of unduly large proportions of the charge into coke, and without damaging the catalyst by excess carbonaceous deposition thereon.

The so-called "fixed bed" catalytic hydrodesulfurization of hydrocarbon mixtures such as sulfur-containing hydrocarbon oils of petroliferous origin has been known for many years. In such hydrodesulfurizations a sulfur-resistant catalyst such as nickel sulfide is provided in the form of a stationary bed of pellets or granules within the reactor. Hydrogen and the hydrocarbons to be converted are passed through this catalyst bed at elevated temperature and pressure. Hydrocarbons are hydrogenated and cracked, and most of the sulfur contained in the charge is converted to hydrogen sulfide, in which form it may be separated from the hydrogen and hydrocarbon products of the reaction.

In processing residual-containing feeds in this manner, it was previously thought necessary either to use hydrogen pressures of relatively great magnitude, e. g., 3000 p. s. i. g. or much greater, or to employ relatively short on-stream periods, e. g., of a few hours in length, alternated with regeneration of the catalyst. These expedients were considered necessary in order to avoid excessive deposition of carbonaceous deposits upon the catalyst.

The expedient first mentioned is unsatisfactory in many respects, since much greater quantities of hydrogen are necessary for circulation through the reactor, larger quantities of hydrogen are consumed, equipment costs are increased, and the quality of the products is reduced because of excessive hydrogenation of aromatics.

The latter expedient is undesirable, since a large amount of time and facilities are devoted to non-productive operations, i. e., catalyst regeneration, purges, etc.

In the catalytic hydrodesulfurization of hydrocarbon mixtures it is theoretically possible to raise the hydrogen pressure to a degree at which no coke will be formed. However, practical limitations necessitate the use of lower pressures at which some carbonaceous material or coke will be formed on the catalyst. This coke accumulates on the catalyst throughout the on-stream or processing period, and if the reaction is continued, the coke tends to mask the catalyst from the reactants and eventually plugs the catalyst bed.

Accordingly, when employing relatively low or middle pressures, resort to other procedures, such as short-cycle operation followed by catalyst regeneration, is usually had in order to prevent excessive build-up of coke on the catalyst. Regeneration of the catalyst is normally carried out by oxidizing or burning off the carbonaceous deposits intermittently with processing periods. For the previously known low or middle pressure, fixed bed, regenerative catalytic hydrodesulfurization processes, it has been found that extension of the processing period beyond a few hours gained little or nothing, since a disproportionate increase in regeneration requirements, and/or plugging of the catalyst bed was the net result. Moreover, since product quality decreased during the short processing period, it was believed that this decrease in quality would continue with any increase in the on-stream period. This effect has been observed in both fixed bed and fluidized catalytic cracking.

Thus, as a result of the considerations outlined above, when effecting the catalytic hydrodesulfurization of hydrocarbon mixtures containing heavy residual components, it was thought necessary to either employ extremely high hydrogen pressures or lower pressures and a short processing period. Neither of these choices represents the most satisfactory form of operation.

It is an object of this invention to provide a catalytic hydrodesulfurization process which will enable the treatment of hydrocarbon mixtures containing difficultly vaporizable, residual components at middle pressures, for long periods of time, with the production of high quality products. It is a further object to attain this end without loss of an excessive proportion of the charge in the form of coke, and without harm to the catalyst. A more limited object is to provide a process of the type described which will permit catalytic hydrodesulfurization of total crude oil, or topped or reduced crude, or other comparatively low-grade, difficultly vaporizable hydrocarbon oils. Still another object is to provide a process of the type described which will not produce a disproportionate increase in regeneration requirements despite the unusually long processing periods employed. A specific object is to provide a process of the type described which will utilize to the maximum efficiency the activity of the catalyst with at the same time minimum coke formation. Other objects will appear hereinafter.

These and related objects are accomplished by my invention which comprises a process for catalytic conversion of a sulfur-containing hydrocarbon mixture to lower boiling products of substantially reduced sulfur-content, said hydrocarbon mixture containing difficulty vaporizable hydrocarbon constituents which are in the liquid phase at reaction conditions. The process includes the steps of contacting this hydrocarbon mixture while partially in vapor phase with hydrogen and particles of a hydrogenation catalyst at a temperature between about 750° F. and 950° F. and at a pressure between about 750 and 2000 p. s. i. g., maintaining the catalyst particles in a turbulent, suspended condition in the hydrogen and hydrocarbon vapors during said contacting, separating catalyst particles from hydrogen and hydrocarbon reaction products, and continuing to contact additional hydrocarbon mixture with hydrogen and the same catalyst particles, terminating this contacting near the time at which the rate of carbonaceous deposition on the catalyst again begins to rise rapidly, which time occurs following a first period in which the rate of carbonaceous deposition is relatively rapid, and a second period in which the rate of carbonaceous deposition is relatively constant.

While certain preferred embodiments of the invention are set forth in the accompanying description, it is understood that these are by way of illustration only and are not intended as limiting.

Figure 2:
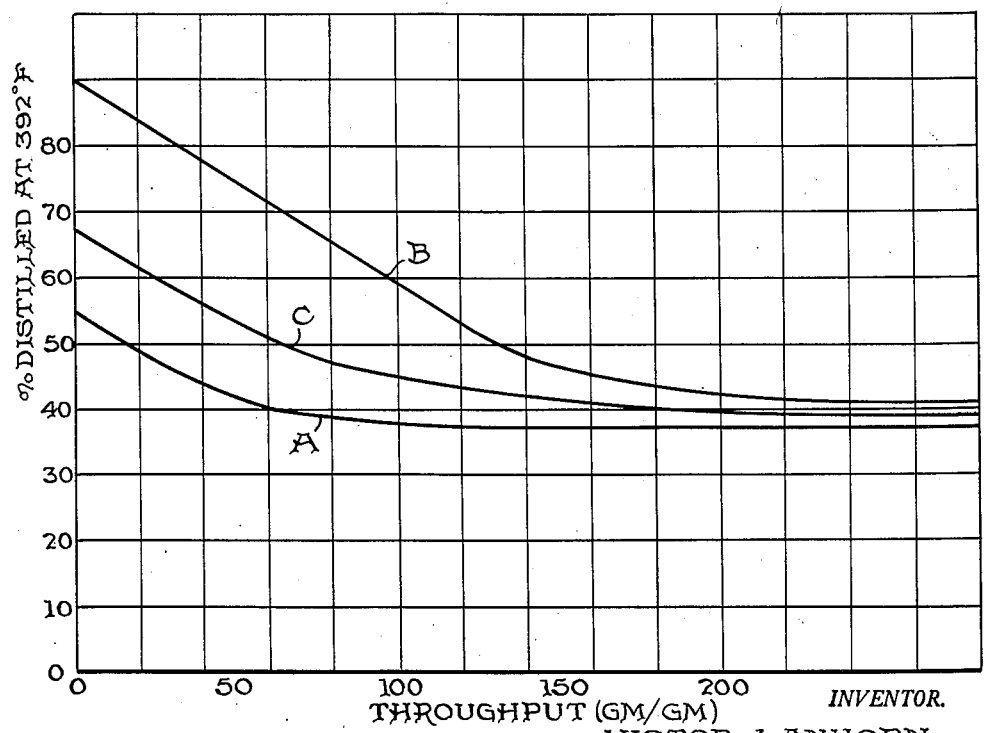
Figure 3:
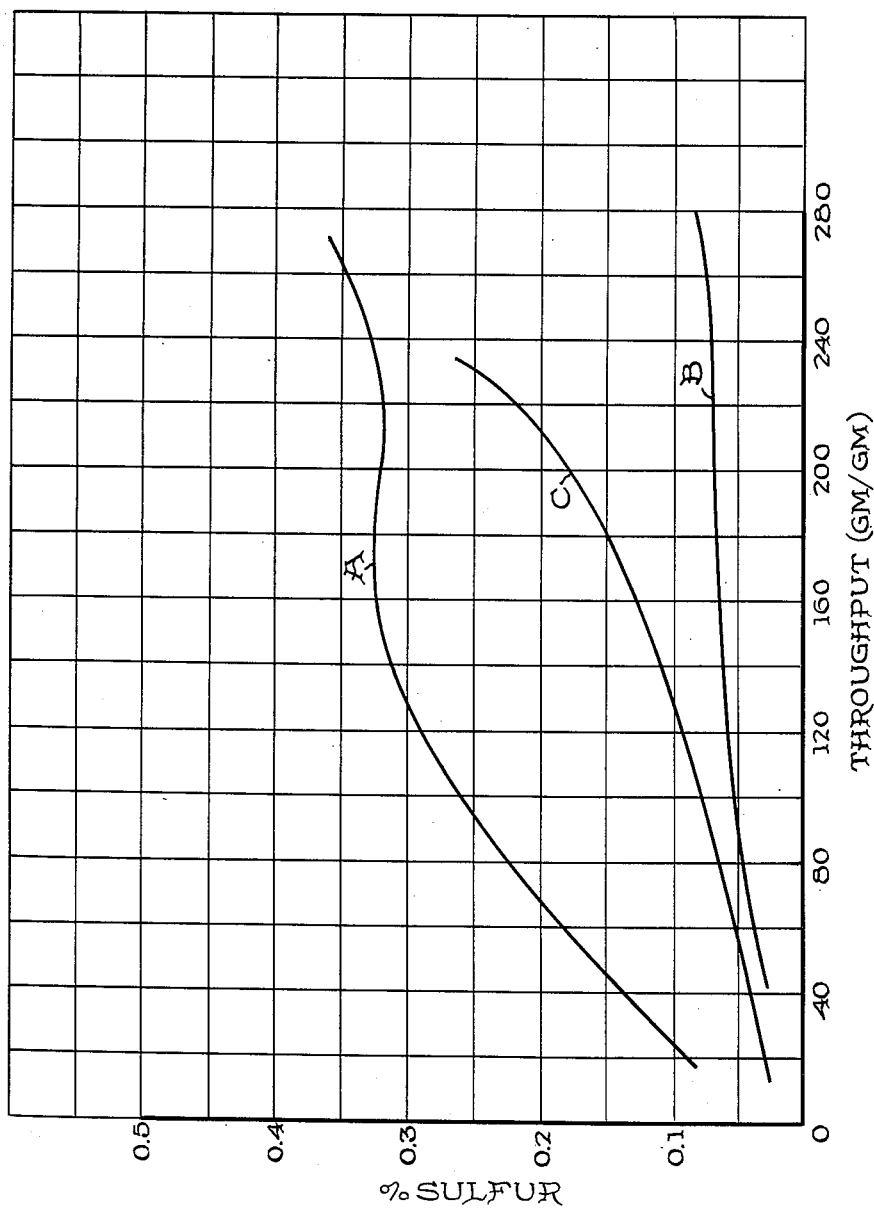

Referring briefly to the attached drawings, in Figure 1 there are shown three graphic plots of coke laydown against throughput for runs involving the catalytic hydrodesulfurization of crude oil at middle pressures and at other conditions according to the present invention. In Figure 2 there are shown three plots of product boiling below 392° F. against throughput for low pressure catalytic hydrodesulfurization runs. Figure 3 plots percent sulfur in product against throughput for the same reaction.

In the operation of the invention the hydrocarbon mixture containing liquid phase constituents, preferably in admixture with hydrogen, and preheated, partially vaporized and compressed to the desired temperature and pressure may be passed upwardly into a reactor containing finely divided particles of a hydrogenation catalyst. Introduction of mixed liquid-vapor phase feed is maintained at a rate sufficient to fluidize the catalyst particles. Within the reactor the feed is intimately contacted with the catalyst particles. The liquid is absorbed by catalyst as soon as it is introduced into the reactor.

In the first stages of the reaction hydrogenation, cracking, and desulfurization predominate. In later stages, cracking takes place to a lesser degree, but hydrogenation and desulfurization continue rather strongly. Thus the over-all reaction, viewed broadly, accomplishes desulfurization, hydrogenation, and relatively mild hydrocracking.

Converted products and unreacted hydrogen are separated from the catalyst particles and collected for fractionation and/or further refining. The treatment is continued with additional feed but with the same catalyst particles to the point indicated above. Following this step, the processing period is terminated, and the catalyst may be regenerated or replaced. A new processing period is then begun.

From the brief description of the invention given above, it will be noted that the process is of the so-called "fluidized fixed bed" type, i. e., a fluidized fixed catalyst bed is employed to hydrodesulfurize the hydrocarbon feed.

Fluidized catalytic operations are well known; accordingly no detailed description thereof is necessary. In general, such processes involve the upward passage of a fluidizing gas through a bed of finely divided catalyst particles at a rate sufficient to maintain these particles in a state of hindered settling. In such operations the velocity of the fluidizing gas may be sufficient or insufficient to permit random motion of the particles throughout the entire reactor, but in any event is adequate to separate the particles from one another and to allow them some degree of circulation.

The fluidized type of operation is essential to this invention, in view of the extremely long processing periods employed and the residual containing feeds. A stationary catalyst bed will not permit long processing periods with feeds containing heavy residual oils. By residual containing feeds is meant those hydrocarbon mixtures which contain heavy, liquid, residual components which are difficultly vaporizable at the conditions of the reaction, and which may persist in the liquid phase within the reactor for a relatively long period of time. When such stocks are charged to a stationary catalyst bed, the liquid may accumulate on the catalyst first contacted, or that in the vicinity of the reactor inlet, until the catalyst can absorb no more liquid. When the catalyst pellets have absorbed all the liquid possible, a liquid film forms on the catalyst particles near the inlet. This results in extremely rapid coking and plugging of the catalyst bed.

Fluidized catalytic beds are more tolerant of liquid in the feed, since the catalyst is in motion, i. e., after the catalyst particles near the reactor inlet have absorbed some liquid, they are free to move away from the inlet and be replaced by other catalyst particles containing no liquid.

An overriding reason for employing a fluidized bed of catalyst is that the phenomena made use of in this invention cannot occur with fixed catalyst beds.

The fluidized catalyst bed employed in this invention is of the fluidized "fixed" type for reasons which are related to the type of reaction involved. By fluidized fixed bed operation is meant that fluidized catalytic technique in which catalyst is neither added to nor removed from the reaction in substantial amounts during the on-stream period. In other words, at the termination of the processing period the feed is contacting the same particles which were present in the reactor at the start of the period and without substantial intervening regeneration.

One of the reasons for employing a fluidized fixed catalyst bed is that the catalytic hydrodesulfurization of hydrocarbon mixtures is an exothermic reaction. Consequently, part of the heat necessary in the reactor is supplied by the heat of the reaction itself, the remainder being supplied by preheating the charge stock. The significance of this fact is that no large quantities of heat need be added by hot regenerated catalyst as is the case in fluidized catalytic cracking, the most common moving bed, fluidized catalytic operation. Therefore, with respect to the factor of heat required for the reaction, the same catalyst particles may be utilized in the reactor throughout the entire on-stream period.

In the second place, it has been found difficult to operate ordinary fluidized moving bed apparatus at pressures substantially above atmospheric pressure, since at these pressures it is difficult to avoid upsetting the relatively small pressure differential maintained across the catastaltic leg between the reactor and regenerator. Where such fluidized moving bed catalytic operations at elevated pressure are desired, it has been found preferable to operate the regenerator at substantially atmospheric pressure and to employ specially designed equipment to transfer catalyst from the high-pressure reactor to the low-pressure regenerator and back again. To avoid the use of expensive, specially designed equipment, it is desirable to employ a fluidized fixed bed type of operation.

It may also be noted that since the essence of the invention involves the unusually long utilization of the catalyst in a processing period, and since no more heat is necessarily added than that which can be added by means of the preheated feed, little or nothing is to be gained by the use of a fluidized moving bed catalytic system wherein catalyst is continuously regenerated.

As also indicated in the previous brief description of the invention, the process is carried out with a sulfur-containing hydrocarbon mixture containing difficultly vaporizable hydrocarbon constituents. These difficultly vaporizable constituents are commonly called "residuals." These components are not capable of being vaporized at reaction conditions without decomposition. Since they are decomposed or converted with greater difficulty than lower boiling constituents, the residuals tend to persist in an absorbed liquid phase within the reactor for a substantial period of time before being decomposed to vaporizable constituents.

The process of this invention is carried out at a temperature of between about 750° and 950° F. and at a pressure of between about 750 and 2000 p. s. i. g. While the temperature conditions are more or less conventional for this type of reaction, the pressure employed is much lower than previously thought practical for long cycle processing of low-grade feed stocks of the type treated by my invention. The relatively low pressures utilized effect a large savings in equipment and hydrogen costs.

Undoubtedly, the most unusual single feature of my invention is the long-onstream period. This unusually long processing period unexpectedly has been found practical despite the low pressure and low-grade feeds employed. It is to be emphasized, however, that my invention involves more than merely carrying out the low pressure catalytic hydrodesulfurization of heavy hydrocarbon mixtures for a long time. While this in itself is remarkable in view of the relatively low pressures and high coke forming tendencies of the feed, I have found that there is a critical limit, beyond which it is highly inefficient to operate further. This point of time in the processing period occurs well before the time at which sufficient coke is deposited on the catalyst particles to cause difficulty in fluidization and also before the time at which the quality of the product drops off appreciably. In other words the critical point mentioned occurs before the time at which it is necessary to discontinue further treatment for normal reasons.

As indicated in the initial statement of the invention, this critical point at which treatment is discontinued occurs before a period in which the rate of carbonaceous deposition on the catalyst again becomes relatively rapid and following a first period in which the rate of carbonaceous deposition is relatively rapid and a second period in which the rate of carbonaceous deposition is relatively constant.

Contrary to expectations, I have discovered that continuing the relatively low pressure, high temperature, fluidized catalytic hydrodesulfurization of hydrocarbon mixtures containing difficultly vaporizable constituents does not continue to deposit coke on the catalyst at the initial rapid rate. I have found that after a period of relatively rapid coke laydown, a period follows in which coke laydown is relatively constant. More important, I have found that a third period follows the period of relatively constant coke laydown during which the rate at which coke is formed and deposited on the catalyst again becomes quite rapid. A primary feature of the invention involves cessation of the processing period at or near the end of the second described period, before a large amount of coke is deposited during the third described period.

The time at about which the processing should be discontinued has been found to be reached after between about 15 and 45% (by weight) of carbonaceous material, or "coke" has been deposited on the catalyst. The precise percentage varies according to the particular feed material chosen and also according to the temperature and pressure (within the limits disclosed). Thus, when using higher pressures, feeds of low asphaltic content and lower temperatures, the percentage of coke on catalyst at about which processing should be terminated will be nearer 15%; similarly, with a converse choice of pressure and temperature conditions, and a heavier feed, the percentage would be nearer 45%.

The optimum point for termination may be determined for any given feed and set of conditions by a single trial run, wherein samples of catalyst are periodically removed from the reactor and analyzed for carbon content by conventional methods. Plotting coke content against throughput will indicate the second point of change in the rate of coke accumulation, or that point near which processing should be discontinued. After this trial run has been made, the process may be controlled on a time basis alone and repeated for as many times as desired.

The examples following illustrate clearly the important elements of the invention. Each run presented was carried out on a West Texas crude having the following characteristics:

TABLE I

*Desalted West Texas crude*

| | |
|---|---|
| Gravity, °API | 36.3 |
| Sp. gr | 0.8433 |
| Distillation: | |
| 10% °F | 358 |
| 30% °F | 528 |
| 50% °F | 728 |
| 70% °F | 940 |
| Percent at 392° F | 33.8 |
| Percent at 500° F | 45.8 |
| Percent at 590° F | 58.7 |
| Pour point °F | −5 |
| Flash point P. M. °F | 75 |
| Carbon residue | 2.06 |
| Sulfur percent | 1.39 |

EXAMPLE I

A long cycle catalytic hydrodesulfurization run was made on West Texas crude of the characteristics set forth above. The catalyst employed was 10 percent by weight nickel-tungsten oxide (1:1 Ni:W ratio) on commercial silica-alumina microspheres and was prepared by a double impregnation method, followed by calcining to form metallic oxide. The weight-hour space velocity was 1.0; the pressure was 1000 p. s. i. g., and the hydrogen:oil ratio was 10,000 s. c. f. hydrogen per barrel of oil. The temperature was maintained as near to 820° F. as possible. The product recovery and total product analysis at various points in the processing period are presented in Table A. In this and other runs, samples of catalyst were periodically removed from the reactor and were analyzed for carbon content. The weight percent of carbon on the catalyst for these analyses are included in Table A.

TABLE A

| Period No | 1 | 2 | 3 | 4 | 5 | 6 | 7 | 8 | 9 | 10 | 11 |
|---|---|---|---|---|---|---|---|---|---|---|---|
| Cumulative Throughput, gm./gm. | 23.8 | 47.6 | 71.4 | 95.2 | 119.0 | 142.8 | 167.6 | 191.0 | 214.8 | 238.6 | 265 |
| Temperature, °F | 818 | 813 | 813 | 813 | 815 | 818 | 817 | 816 | 817 | 820 | 818 |
| Wt. Percent Recovery: | | | | | | | | | | | |
| Gas C₁ through C₃ | 4.1 | 2.7 | 2.2 | 2.6 | 1.6 | 2.0 | 2.9 | 2.7 | 2.1 | 5.1 | 2.6 |
| Liquid | 97.8 | 96.4 | 99.2 | 96.9 | 97.0 | 97.5 | 96.3 | 97.8 | 94.9 | 100.0 | 97.3 |
| Total | 101.9 | 99.1 | 101.4 | 99.5 | 98.6 | 99.5 | 99.2 | 100.5 | 97.0 | 105.1 | 99.9 |
| Total Product Analysis: | | | | | | | | | | | |
| Gravity, °API | 45.6 | 42.7 | 42.0 | 40.7 | 41.0 | 40.5 | 40.2 | 40.7 | | 40.8 | 40.8 |
| Percent Sulfur | 0.109 | 0.163 | 0.184 | 0.243 | 0.32 | 0.29 | 0.32 | 0.32 | | 0.31 | 0.36 |
| Distillation, Percent: | | | | | | | | | | | |
| 392° F | 48.7 | 41.4 | 39.0 | 38.9 | 37.0 | 36.8 | 36.7 | 38.4 | | 37.2 | 37.1 |
| 500° F | 68.9 | 60.4 | 57.6 | 55.0 | 54.0 | 53.5 | 55.7 | 54.9 | | 53.7 | 53.1 |
| 590° F | 83.9 | 75.4 | 72.1 | 69.5 | 68.0 | 68.0 | 68.1 | 68.9 | | 68.7 | 68.1 |
| Carbon Log, Percent Carbon By Wt | | 19.0 | 26.0 | | 34.5 | | 39.8 | | 51.0 | | 81.0 |

EXAMPLE II

A second long cycle catalytic hydrodesulfurization run was made on West Texas crude with 10 percent nickel-tungsten oxide (1:1 Ni:W ratio) supported on commercial microspheres of silica-alumina and prepared as in Example I. The weight-hour space velocity of this run was 1.0; the pressure was 1500 p. s. i. g., the hydrogen to oil ratio was 16,500 s. c. f. hydrogen per bbl. oil; and the temperature was maintained as near 820° F. as possible. Product and catalyst were periodically checked as in Example I. The results of this run are presented in Table B below:

TABLE B

| Period No. | 1 | 2 | 3 | 4 | 5 | 6 | 7 | 8 | 9 | 10 | 11 | 12 |
|---|---|---|---|---|---|---|---|---|---|---|---|---|
| Temperature, °F | 814 | 824 | 821 | 823 | 823 | 822 | 818 | 817 | 819 | 820 | 818 | 817 |
| Cumulative Throughout, gm./gm. | 23.4 | 46.3 | 69.6 | 92.5 | 115.1 | 137.7 | 160.6 | 182.5 | 205.5 | 229.0 | 252.0 | 276.0 |
| Weight Percent Recovery: | | | | | | | | | | | | |
| Gas $C_1$ thru $C_3$ | | | | 4.84 | | 2.73 | | | | | | |
| Liquid | | | | 95.23 | | 94.8 | | | | | | |
| Total | | | | 100.07 | | 97.5 | | | | | | |
| Total Product Inspection: | | | | | | | | | | | | |
| Gravity, °API | 58.1 | 56.9 | 54.2 | 51.7 | 47.5 | 47.8 | 45.3 | 44.6 | 43.1 | 43.4 | 44.3 | 44.4 |
| Percent Sulfur | 0.067 | 0.037 | 0.033 | 0.048 | 0.028 | 0.046 | 0.079 | 0.061 | 0.07 | 0.06 | 0.07 | 0.09 |
| Distillation, Percent: | | | | | | | | | | | | |
| 392° F | 82.7 | 76.2 | 68.6 | 63.3 | 51.8 | 54.6 | 45.9 | 45.8 | 40.8 | 40.7 | 43.5 | 44.0 |
| 500° F | 96.2 | 91.5 | 86.1 | 82.4 | 72.4 | 75.1 | 64.9 | 65.4 | 59.8 | 59.2 | 62.1 | 63.0 |
| 590° F | | | 98.5 | 95.8 | 93.4 | 87.0 | 88.2 | 79.3 | 80.4 | 75.8 | 75.4 | 78.6 | 79.1 |
| Ovhd. $Br_2$ No. | | | | 1.7 | | 2.5 | | | | 4.9 | | |
| Btms. Carbon Residue | | | | 1.7 | | | | | | | | |
| Aniline Point, °F | | | | 0.06 | | 0.01 | | | 0.01 | 0.01 | | |
| Catalyst Laydown Log, Wt. Percent | | | 56.4 | 57.5 | | | | | | 64.8 | | |
| Laydown | | | | 12.0 | 15.5 | 16.4 | | 20.0 | | 23.8 | | 45.4 |

EXAMPLE III

A further experiment was carried out on the West Texas crude employing a 12 percent nickel-tungsten oxide (1:1 Ni:W ratio) catalyst, prepared by single impregnation of silica-alumina microspheres and followed by calcining to form the oxide. The pressure was 1500 p. s. i. g.; the weight-hour space velocity was 2.0; the hydrogen to oil ratio was 10,000 s. c. f. hydrogen per bbl. oil, and the temperature was maintained as near to 850° F. as possible, and catalyst and product were periodically analyzed as in the previous examples. These results are presented in Table C.

TABLE C

| Period No. | 1 | 2 | 3 | 4 | 5 | 6 | 7 | 8 | 9 | 10 |
|---|---|---|---|---|---|---|---|---|---|---|
| Temperature, ° F | 840 | 848 | 843 | 849 | 841 | 845 | 848 | 855 | 847 | 846 |
| Cumulative Throughput, gm./gm. | 24.3 | 47.6 | 72.6 | 96.0 | 119.3 | 142.4 | 165.0 | 188.5 | 209.4 | 233.1 |
| Wt. Percent Recovery: | | | | | | | | | | |
| Gas $C_1$ and $C_3$ | | | | | | | | | 3.3 | |
| Liquid | | | | | | | | | 96.4 | |
| Total | | | | | | | | | 99.7 | |
| Total Product Inspection: | | | | | | | | | | |
| Gravity, ° API | 50.7 | 47.8 | 45.8 | 44.6 | 43.2 | 42.8 | 42.8 | 43.1 | 42.8 | 41.7 |
| Percent Sulfur | 0.031 | 0.033 | 0.068 | 0.068 | 0.088 | 0.11 | 0.16 | 0.17 | 0.8 | 0.25 |
| Distillation percent: | | | | | | | | | | |
| 392° F | 60.7 | 54.9 | 47.9 | 45.2 | 41.4 | 45.4 | 40.8 | 42.1 | 41.9 | 38.8 |
| 500° F | 80.7 | 75.4 | 67.6 | 65.2 | 60.0 | 62.0 | 56.3 | 61.6 | 61.3 | 56.8 |
| 590° F | 92.9 | 90.4 | 83.7 | 82.2 | 76.0 | 79.6 | 75.5 | 76.2 | 75.9 | 72.8 |
| Ovhd. $Br_2$ No. | | | | | | 5.5 | | | 6.5 | 9.0 |
| Bottoms Carbon Residue | | | | | | 0.05 | | | 0.04 | 0.07 |
| Aniline Point, ° F | | 59.5 | | | | | | | | |
| Carbon Log, Wt. Percent Laydown | | 7.8 | | 15.0 | 21.0 | 23.8 | | 29.7 | | 51.0 |

For each of the experiments described the carbon content of the catalyst was plotted against the cumulative throughput at the time of the carbon analysis. The points were then connected by a smooth curve. Referring to Figure 1, curve A corresponds to the results presented in Table A; curve B corresponds to the results presented in Table B; and curve C corresponds to the results shown in Table C. It will be noted that each curve illustrates the novel effect previously discussed. In particular these curves reflect a first period in which the carbon laydown is relatively rapid, a second period in which the carbon laydown is relatively constant, and a third period in which the carbon laydown again becomes relatively rapid. In each instance, the final inflection in the curve occurred at between 15 and 45 percent carbon on the catalyst.

Another result peculiar to the reaction involved in the instant invention is that the final period of rapid coke accumulation is not reflected in the quality of the product. Contrary to expectations it was found that the percentage of gasoline, i. e., the percent of product boiling below 392° F., remained relatively constant. In Figure 2 the percent of product boiling below 392° F. has been plotted against throughput for the data presented in Tables A, B and C, and the points connected by smooth curves. Curves A, B, and C correspond to the results of Tables A, B, and C respectively. In each instance, the percent of gasoline declined during the first period of rapid coke accumulation but lined out before and during the final period of rapid coke accumulation.

The significance of this result is readily evident. In ordinary fixed bed processing such as catalytic cracking, short-cycle hydrodesulfurization, or short cycle hydrocracking, the most common procedure followed is to continue processing until the quality of the product goes down, following which the catalyst is regenerated or replaced. Such a procedure would be ineffective in the instant invention to determine the proper place for stopping the processing period. This data also clearly indicates that the activity of the catalyst remains constant during the final period of rapid coke accumulation. This is contrary to results obtained in catalytic cracking, for example, where it is known that the percent of carbon on the catalyst directly affects the activity thereof.

Finally, in Figure 3, percent sulfur in the product has been plotted against throughput for the data of Tables A, B and C and the points connected in smooth curves A, B and C for the respective tables. Again it will be noted that the desulfurization activity of the catalyst remains high throughout the entire length of the runs. In this connection it may be noted that the sulfur content of the charge stock was originally 1.39%.

Thus, it has been shown that contrary to previous beliefs, the low pressure catalytic hydrodesulfurization of feeds containing residual oils may be continued for a long period of time without continuous decline in product quality, that catalyst activity remains relatively high, and that there is a critical point in the processing period beyond which it becomes undesirable to continue processing, despite the fact that product quality remains uniformly high and the fact that the fluidized catalyst may tolerate considerably more carbon without difficulties in fluidization.

The reasons for stopping near this point are believed to be obvious, but for the sake of clarity it may be noted that continuing the processing indefinitely into the third period has the major disadvantages of excessively increasing regeneration requirements with at the same time a reduction in the yield of product, of risking catalyst damage by burning off large amounts of carbon, of wasting oil in the form of coke, and of the eventual plugging and total loss of the catalyst in the reactor.

While I do not intend to be limited by any particular theory with respect to the mechanism by which the results described take place, it is my belief that the rate form oxides. The pressure maintained was 1500 p. s. i. g.; the wt. hr. space velocity was 1.0; the hydrogen to oil ratio was 20,000 s. c. f. hydrogen per barrel of oil; and the temperature was maintained as near to 820° F. as possible. Periodic analyses of product and catalyst were made as in the previous examples.

Inspection of the following data will indicate that the same trends noted previously are present, i. e., carbon deposition increased rapidly in the first stages (9.4 percent increase in first 46.9 hours), then leveled off (7.0 percent increase in the next 45.7 hours), then increased rapidly again (12.4 percent increase in the next 51.3 hours); the percent sulfur in product remained low throughout the run.

TABLE D

| Period No. | 1 | 2 | 3 | 4 | 5 | 6 | 7 |
|---|---|---|---|---|---|---|---|
| Temperature, °F | 820 | 819 | 819 | 821 | 813 | 814 | 818 |
| Cumulative Throughput | 23.5 | 46.9 | 69.6 | 92.6 | 120.7 | 143.9 | 166.5 |
| Weight Percent Recovery: | | | | | | | |
| Gas $C_1-C_3$ | | 4.3 | | 3.5 | | | |
| Liquid Product | | 96.9 | | 98.2 | | | |
| Sulfur | | 1.4 | | 1.3 | | | |
| Carbon | | | | | | | |
| Total | | 102.6 | | 103.0 | | | |
| Total Product Inspection: | | | | | | | |
| Gravity, °API | 49.7 | 45.0 | 42.6 | 43.8 | 43.0 | 42.9 | 42.4 |
| Sp. Gr. 60/60 | 0.7809 | 0.8017 | 0.8128 | 0.8072 | 0.8104 | 0.8114 | 0.8137 |
| Percent Sulfur | 0.076 | 0.10 | 0.18 | 0.133 | 0.179 | 0.151 | 0.174 |
| Distillation, Percent at: | | | | | | | |
| 392° F | 58.7 | 51.0 | 41.8 | 43.7 | | 43.1 | 40.4 |
| 500° F | 78.4 | 68.8 | 59.5 | 61.7 | | 60.8 | 58.6 |
| 590° F | 92.2 | 84.0 | 74.3 | 76.7 | | 75.2 | 73.8 |
| Carbon Log, Wt. Percent Laydown | | 9.4 | | 16.4 | | 28.8 | | of carbon or coke accumulation is a function of the population of active hydrogenation centers exposed on the catalyst. At the start of the long reaction cycle, considerable hydrogenation, desulfurization and cracking are obtained, principally because a maximum number of cracking centers and hydrogenation and desulfurization centers are available. During this period oil is absorbed on the catalyst and is cracked by virtue of intimate contact with the active cracking centers of the catalyst.

In addition to this cracking mechanism, the oil absorbed on active hydrogenation and desulfurization centers is hydrogenated to products which can crack more easily or transfer their hydrogen to absorbed oil not in contact with the hydrogenation centers. Sulfur contained in the oil is converted to hydrogen sulfide.

As the cracking continues, the cracking activity due to the cracking centers mentioned is gradually masked because of coke formation, and the hydrogenation and cracking becomes predominantly dependent upon the population of active hydrogenation centers. As the population of these centers is decreased by being covered with carbonaceous material, the absorbed residual oils cannot receive additional hydrogen through hydrogenation but rather are further depleted of hydrogen through cracking and hydrogen transfer. When this point in the processing period is reached, a rapid increase in carbonaceous laydown can be expected. The change in the rate of carbonaceous accumulation is not reflected in the quality of the product. The degree of conversion remains constant during this time because the only difference in the reaction is that the absorbed residual oils revert more rapidly to coke.

This suggested mechanism is substantiated by the fact that the effects noted above are unique to hydrosulfurization carried out at the pressures described.

EXAMPLE IV

An additional fluidized fixed bed hydrodesulfurization run was made employing West Texas Crude and 9.6 percent cobalt-molybdenum oxide (cobalt molybdate) deposited by impregnation with soluble salts on microspheres of silica-alumina and followed by calcining to The process of the invention is applicable to any type of charge stock which contains difficultly vaporizable hydrocarbons, by which is meant hydrocarbons which cannot be vaporized in conventional commercial heaters at the reaction pressure without substantial decomposition. Examples of such stocks are crude petroleum, reduced crude, topped crude, shale oil and heavy residual hydrocarbon oils. The invention is of particular value in that it enables treatment of low-grade, heavy hydrocarbon mixtures which contain large amounts of asphaltic material and/or have a high carbon residue. The asphaltic and high carbon residue constituents are up-graded to low boiling hydrocarbons of good quality and the sulfur components are largely converted to hydrogen sulfide. The fact that crude oil may be charged directly to the reactor is of definite significance, since heretofore it has been considered undesirable to charge such heavy stocks directly to a catalytic process without some previous refining step to reduce coke-forming tendencies of the feed, e. g., removal of the heavy ends by fractionation, coking, etc. It is emphasized that this invention not only makes practical the direct treatment of crude oil, but also the direct catalytic treatment of the lower-grade, heavier cuts of the crude.

A small or large proportion of the hydrocarbon feed may be in liquid phase when introduced into the reactor with the remainder of this feed being in vapor phase. These liquid components are preferably introduced onto the catalyst as fast as they are converted to volatile products, but not so fast as to form a bridge between the catalyst particles, since this may lead to slurrying and extremely rapid coke formation. Analysis indicates that the catalyst absorbs and holds from 20 to 50 percent by weight of hydrocarbon during the reaction. Carbon or coke is also present and continues to build up. Rather than detrimental, the charging of feed at least part of which is in liquid phase to a fluidized catalyst bed has actually been found to be of distinct benefit in that the liquid material acts as a hydrogen transfer agent, thus increasing the rate of hydrogenation.

As stated previously, the catalyst bed must be fluidized in order to accommodate liquid constituents and the large total amount of coke. By "fluidized" catalyst is meant the conventional dense phase bed operation, or operations in which the catalyst particles are more closely packed or more greatly dispersed. It is advantageous to operate in or near the conditions producing minimum fluidization, i. e., where just sufficient gas and vapors are employed to separate and suspend the particles. This type of operation enables a reduction in the length of the reactor (important with high pressure vessels), a reduction in the amount of hydrogen circulated, a reduction in catalyst attrition, and a reduction in the capacity of the gas-solids separating means employed to separate entrained catalyst from product vapors. Linear gas velocities of from 0.01 to 0.5 ft./sec. produce these minimum conditions of fluidization (these velocities compare with velocities of 1 to 2 ft./sec. usually employed in fluidized catalytic cracking).

Since the reaction is exothermic and no heat need be added by means of hot regenerated catalyst, a much lower catalyst to oil ratio than normally employed is permitted. Satisfactory ratios are between about 1:2 and 1:16, although lower or higher ratios may be employed. These ratios compare with ratios between about 5:1 and 30:1 employed in fluidized catalytic cracking.

Satisfactory space velocities for temperatures between about 750° and 950° F. are between about 0.1 and 5 unit weights of hydrocarbon per unit weight of catalyst per hour. Lower or higher space velocities may be employed. Temperatures above about 950° F. result in excessive formation of coke and gas, and temperatures below about 750° F. provide insufficient conversion. Preferably a temperature of between about 800° and 875° F. is employed. It has been found that coke formation is higher below and above this temperature range, although coke formation normally increases with temperature.

Pressures of between about 750 and 2000 p. s. i. g. may be employed. Substantial departure from these limits should not be made, since the unusual characteristics of the invention are peculiar to pressures within this range. Pressures from about 1000 to about 1500 p. s. i. g. are preferred. With these pressures the second inflection in the coke-throughput curve occurs after deposition of between 20 and 40% coke.

Hydrogen to oil ratios of between about 300 and 20,000 standard cubic feet of hydrogen per barrel of oil may be used. A ratio between about 5000 and 10,000 is preferred.

Any finely divided hydrogenation catalyst may be employed. Examples of suitable catalysts are molybdenum, tungsten, vanadium, chromium, cobalt, iron, nickel, tin, and their oxides and sulfides.

Mixtures or compounds of two or more of these materials may be used advantageously. For example, mixtures or compounds of the iron group metal oxides or sulfides with the oxides or sulfides of group VI lefthand column metals of the periodic table produce superior catalysts. Examples of such mixtures or compounds are nickel molybdate, tungstate or chromate (or the corresponding thio compounds) or mixtures of nickel oxide with molybdenum, tungsten or chromium oxides.

These catalysts are advantageously deposited on or otherwise composited with a porous carrier such as activated alumina, silica gel, or the various synthetic or natural silica-alumina type cracking catalysts or other refractory materials having a large surface area. The composite of hydrogenating catalyst and carrier is prepared in known manner such as by impregnating the carrier particles with a solution of a compound or salt of the desired hydrogenating component followed by calcining (and reduction, if a reduced catalyst is desired). While porous carriers are preferred, non-porous carriers may be employed as also may powders composed entirely of the hydrogenating component.

The catalyst particles are of the size conventionally employed in fluidized catalytic operations, e. g., between about 400 and 50 mesh.

Although fairly large quantities of hydrogen are circulated through the reactor, only small proportions are consumed. In the interest of economy it is desirable to recycle unreacted hydrogen through the reactor. Hydrogen previously passed through the reactor is contaminated with hydrocarbon gases such as methane, ethane, propane, etc. However, recycle hydrogen containing large amounts of these gases has been found satisfactory. The recycle hydrogen is preferably mixed with additional fresh hydrogen on each pass through the reactor.

The long cycle hydrodesulfurization of hydrocarbon oils is accompanied by the deposition of large amounts of coke, and to a lesser extent, other contaminants on the catalyst. The process is terminated near the second change in the rate of coke laydown, following which the catalyst may be revivified or regenerated by burning off the contaminants. Advantageously, a hydrogen purge at reaction conditions of temperature and pressure may be employed following the processing period. Normally a second purge with an inert gas such as steam is performed at atmospheric pressure both preceding and following the regeneration. Regeneration is usually effected by combustion of the contaminants produced by passage of a hot oxidizing gas, e. g., air, diluted with an inert gas such as steam or flue gas through the catalyst, although hydrogenation is sometimes employed. Regeneration is carried out according to the fluidized fixed bed technique as is the processing period. Details of the regeneration conditions form no part of the invention and are well known to the art; therefore, they need not be discussed in detail.

Recapitulating briefly, the invention involves the high temperature, middle pressure hydrodesulfurization of hydrocarbon mixtures containing liquid phase components in a fluidized fixed bed of hydrogenating catalyst. The essence of the invention involves a practical application of the discoveries that such a reaction may be continued much longer than previously thought possible without an undue sacrifice in quality or quantity of product, and that there is a critical point in the latter stages of the processing period beyond which it becomes highly inefficient to operate further. This point is not apparent from the quality of the product, difficulties in fluidization or other readily evident, normally employed indicia. The time near which processing should be discontinued occurs following a first period in which the rate of coke laydown is relatively rapid and a second period in which the rate of coke laydown is relatively constant. It has been found that this point is reached after between about 15 and 45% coke by weight has accumulated on the catalyst.

The invention enables a more efficient utilization of catalyst in on-stream usage, while minimizing the deposition of coke. Over-all regeneration requirements are also reduced. The invention further provides high quality, low-boiling hydrocarbons in good yield from low-grade starting materials. A substantial reduction in sulfur content is effected, which reduction remains large throughout the processing period. The invention also permits usage of much less hydrogen, cheaper equipment, and lower pressures than heretofore thought possible for long-cycle treatment of heavy hydrocarbons.

What I claim is:

1. The process for catalytic conversion of a sulfur-containing hydrocarbon mixture to lower boiling point products of substantially reduced sulfur content, said hydrocarbon mixture containing difficultly vaporizable hydrocarbon constituents which are in the liquid phase at reaction conditions, comprising contacting this hydrocarbon mixture while partially in vapor phase with hydrogen and particles of a hydrogenation catalyst at a temperature between about 750° and 950° F., at a pressure between about 750 and 2000 p. s. i. g., maintaining the catalyst particles in a turbulent, suspended condition in the hydrogen and hydrocarbon vapors during said contacting, separating catalyst particles from hydrogen and hydrocarbon reaction products, continuing to contact additional hydrocarbon mixture with hydrogen and the same particles of hydrogenation catalyst, terminating the contacting after between about 15 and 45 percent coke has been deposited on the catalyst, at about the time at which the rate of carbonaceous deposition starts a period of rapid increase, which period of rapid increase follows a first period in which the carbonaceous deposition is relatively rapid and a second period in which the carbonaceous deposition is relatively constant and after a throughput of above about 120.

2. The process for catalytic conversion of a sulfur-containing crude petroleum oil to lower boiling point products of substantially reduced sulfur content, said crude oil containing difficultly vaporizable hydrocarbon constituents which are in the liquid phase at reaction conditions, comprising contacting this hydrocarbon mixture while partially in vapor phase with hydrogen and particles of a hydrogenation catalyst at a temperature between about 750° and 950° F., at a pressure between about 750 and 2000 p. s. i. g., maintaining the catalyst particles in a turbulent, suspended condition in the hydrogen and hydrocarbon vapors during said contacting, separating catalyst particles from hydrogen and hydrocarbon reaction products, continuing to contact additional hydrocarbon mixture with hydrogen and the same particles of hydrogenation catalyst, terminating the contacting after between about 15 and 45 percent coke has been deposited on the catalyst, at about the time at which the rate of carbonaceous deposition starts a period of rapid increase, which period of rapid increase follows a first period in which the carbonaceous deposition is relatively rapid and a second period in which the carbonaceous deposition is relatively constant and after a throughput of above about 120.

3. The process for catalytic conversion of a sulfur-containing hydrocarbon mixture to lower boiling point products of substantially reduced sulfur content, said hydrocarbon mixture containing difficultly vaporizable hydrocarbon constituents which are in the liquid phase at reaction conditions, comprising contacting this hydrocarbon mixture while partially in vapor phase with hydrogen and particles of a hydrogenation catalyst at a temperature between about 800° and 875° F., at a pressure between about 750 and 2000 p. s. i. g., maintaining the catalyst particles in a turbulent, suspended condition in the hydrogen and hydrocarbon vapors during said contacting, separating catalyst particles from hydrogen and hydrocarbon reaction products, continuing to contact additional hydrocarbon mixture with hydrogen and the same particles of hydrogenation catalyst, terminating the contacting after between about 15 and 45 percent coke has been deposited on the catalyst, at about the time at which the rate of carbonaceous deposition starts a period of rapid increase, which period of rapid increase follows a first period in which the carbonaceous deposition is relatively rapid and a second period in which the carbonaceous deposition is relatively constant and after a throughput of above about 120.

4. The process for catalytic conversion of a sulfur-containing hydrocarbon mixture to lower boiling point products of substantially reduced sulfur content, said hydrocarbon mixture containing difficultly vaporizable hydrocarbon constituents which are in the liquid phase at reaction conditions, comprising contacting this hydrocarbon mixture while partially in vapor phase with hydrogen and particles of a hydrogenation catalyst at a temperature between about 800° and 875° F., at a pressure between about 750 and 2000 p. s. i. g., and where a linear velocity for the hydrogen and hydrocarbon vapors through the catalyst of between about 0.01 to 0.5 feet per second is employed to maintain the catalyst particles in a turbulent, suspended condition during said contacting, separating catalyst particles from hydrogen and hydrocarbon reaction products, continuing to contact additional hydrocarbon mixture with hydrogen and the same particles of hydrogenation catalyst, terminating the contacting after between about 15 and 45 percent coke has been deposited on the catalyst, at about the time at which the rate of carbonaceous deposition starts a period of rapid increase, which period of rapid increase follows a first period in which the carbonaceous deposition is relatively rapid and a second period in which the carbonaceous deposition is relatively constant and after a throughput of above about 120.

References Cited in the file of this patent

UNITED STATES PATENTS

| Number | Name | Date |
|---|---|---|
| 1,972,948 | Payne | Sept. 11, 1934 |
| 2,472,844 | Munday et al. | June 14, 1949 |
| 2,500,146 | Fleck et al. | Mar. 14, 1950 |
| 2,516,877 | Horne et al. | Aug. 1, 1950 |
| 2,526,966 | Oberfell et al. | Oct. 24, 1950 |
| 2,574,448 | Docksey et al. | Nov. 6, 1951 |
| 2,606,097 | Goodson et al. | Aug. 5, 1952 |
| 2,614,066 | Cornell | Oct. 14, 1952 |